United States Patent
Kontin et al.

(10) Patent No.: US 10,626,774 B2
(45) Date of Patent: Apr. 21, 2020

(54) EXHAUST AFTERTREATMENT DEVICE FOR A MOTOR VEHICLE

(71) Applicant: Daimler AG, Stuttgart (DE)

(72) Inventors: Sinisa Kontin, Stuttgart (DE); Thomas Boldt, Neu-Ulm (DE); Thomas Hermann, Waiblingen (DE); Michael Hochholzner, Nellingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/470,082

(22) PCT Filed: Nov. 30, 2017

(86) PCT No.: PCT/EP2017/080937
§ 371 (c)(1),
(2) Date: Jun. 14, 2019

(87) PCT Pub. No.: WO2018/108543
PCT Pub. Date: Jun. 21, 2018

(65) Prior Publication Data
US 2020/0080457 A1 Mar. 12, 2020

(30) Foreign Application Priority Data

Dec. 15, 2016 (DE) .......... 10 2016 014 966

(51) Int. Cl.
*F01N 3/28* (2006.01)
*B01D 53/94* (2006.01)
(Continued)

(52) U.S. Cl.
CPC ....... *F01N 3/2892* (2013.01); *B01D 53/9431* (2013.01); *B01F 3/04049* (2013.01);
(Continued)

(58) Field of Classification Search
CPC .. F01N 3/2892; F01N 3/2066; F01N 2610/02; F01N 2610/1453; B01F 3/04049; B01F 5/0068
(Continued)

(56) References Cited

U.S. PATENT DOCUMENTS 9,266,075 B2 * 2/2016 Chapman .............. F01N 3/2066
9,346,017 B2 * 5/2016 Greber .................. F01N 3/2066
(Continued)

FOREIGN PATENT DOCUMENTS

DE  10 2012 216 923 A1  3/2014
DE  10 2014 222 698 A1  5/2016

OTHER PUBLICATIONS

PCT/EP2017/080937, International Search Report dated Mar. 2, 2018 (Two (2) pages).
(Continued)

*Primary Examiner* — Tom P Duong
(74) *Attorney, Agent, or Firm* — Crowell & Moring LLP

(57) ABSTRACT

An exhaust gas aftertreatment device for a motor vehicle has an exhaust pipe and a mixing chamber arranged in the exhaust pipe to mix an exhaust gas stream with a reducing agent which can be introduced into the mixing chamber by a dosing device. The mixing chamber has a wall which is on the input side as viewed in a main flow direction of the exhaust gas stream through the exhaust pipe and in which a first inlet for the exhaust gas is formed. The first inlet extends in some regions in a lateral surface region of the input-side wall such that exhaust gas entering the mixing chamber through the first inlet can be set in a rotating motion inside the mixing chamber. The dosing device has an outlet device where a longitudinal axis of the outlet device is inclined towards the main flow direction of the exhaust gas stream.

11 Claims, 11 Drawing Sheets

(51) Int. Cl.
*F01N 3/20* (2006.01)
*B01F 3/04* (2006.01)
*B01F 5/00* (2006.01)
*B01F 5/04* (2006.01)
*B01F 5/06* (2006.01)

(52) U.S. Cl.
CPC .......... *B01F 5/0065* (2013.01); *B01F 5/0068* (2013.01); *B01F 5/0473* (2013.01); *B01F 5/0688* (2013.01); *F01N 3/2066* (2013.01); *F01N 2610/02* (2013.01); *F01N 2610/1453* (2013.01)

(58) Field of Classification Search
USPC .......................................................... 422/168
See application file for complete search history.

(56) References Cited

U.S. PATENT DOCUMENTS

| | | | | |
|---|---|---|---|---|
| 9,581,067 | B2* | 2/2017 | Guilbaud | B01F 5/0268 |
| 9,810,123 | B2* | 11/2017 | Kauderer | B01D 53/9418 |
| 2012/0216513 | A1* | 8/2012 | Greber | F01N 3/2066 60/295 |
| 2013/0216442 | A1* | 8/2013 | Brunel | B01F 3/04049 422/172 |
| 2014/0044603 | A1 | 2/2014 | Greber | |
| 2015/0110681 | A1* | 4/2015 | Ferront | F01N 13/0097 422/168 |
| 2016/0115847 | A1* | 4/2016 | Chapman | B01F 5/0614 60/324 |
| 2016/0158714 | A1* | 6/2016 | Li | B01F 5/0268 60/301 |
| 2016/0319720 | A1 | 11/2016 | Alano | |
| 2016/0319724 | A1* | 11/2016 | Alano | F01N 3/2892 |
| 2017/0066012 | A1* | 3/2017 | Hornback | F01N 3/2066 |
| 2018/0266300 | A1* | 9/2018 | Liu | F01N 3/2066 |
| 2018/0334940 | A1 | 11/2018 | Calvo | |

OTHER PUBLICATIONS

German Search Report issued in German counterpart application No. 10 2016 014 966.3 dated Aug. 11, 2017, with Statement of Relevancy (Nine (9) pages).

* cited by examiner

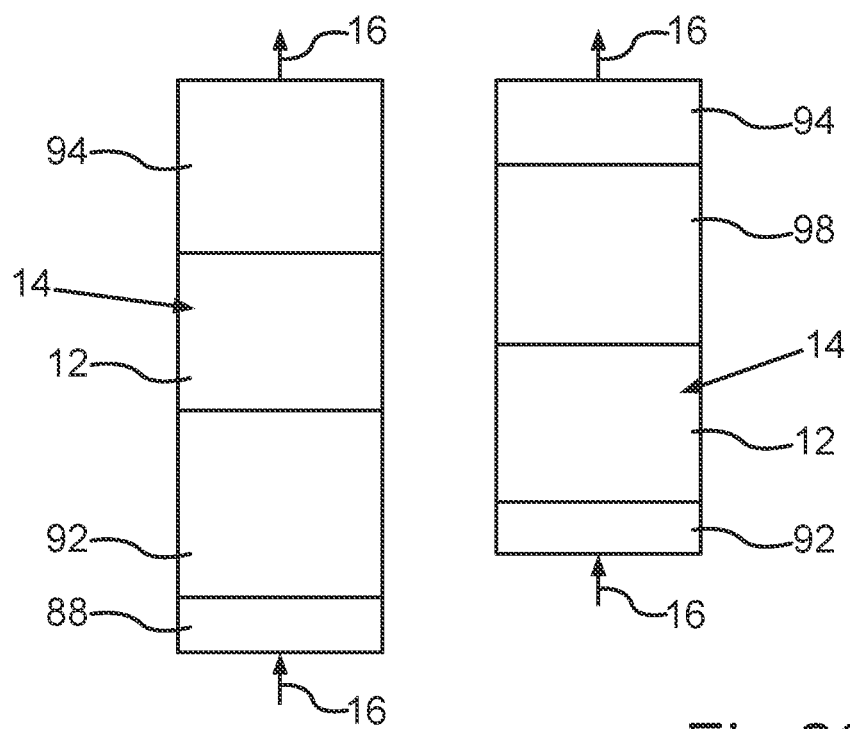

EXHAUST AFTERTREATMENT DEVICE FOR A MOTOR VEHICLE

BACKGROUND AND SUMMARY OF THE INVENTION

The invention relates to an exhaust gas aftertreatment device for a motor vehicle, comprising an exhaust pipe and a mixing chamber arranged in the exhaust pipe for mixing an exhaust gas flow with a reducing agent for exhaust gas aftertreatment. The reducing agent can be introduced into the mixing chamber by means of a metering device of the exhaust gas aftertreatment device. The mixing chamber has a wall which is on the input side as viewed in a main flow direction of the exhaust gas flow through the exhaust pipe and in which a first inlet for the exhaust gas is formed. The first inlet extends in regions of a lateral surface region of the input-side wall in such a way that exhaust gas entering the mixing chamber through the first inlet can be set in rotary motion about the main flow direction inside the mixing chamber.

Subjecting the exhaust gas flow to angular momentum at the entrance to a channel is described in US 2014/0044603 A1. In the channel, a first component which is designed in the form of a weir having an opening, and a second component which is connected to the first component, cause the exhaust gas flow to move in a spiral-like manner through the channel. In this case, the first component is oriented transversely with respect to the longitudinal axis of the channel.

A disadvantage of this exhaust gas aftertreatment device is considered to be the fact that it can lead to the formation of deposits of components of the reducing agent.

The object of the present invention is therefore to provide an exhaust gas aftertreatment device of the type mentioned at the outset, in which a formation of deposits of components of the reducing agent can be avoided to a particularly great extent.

The motor vehicle exhaust gas aftertreatment device according to the invention comprises an exhaust pipe and a mixing chamber arranged in the exhaust pipe. The mixing chamber is used to mix an exhaust gas stream with a reducing agent for the exhaust gas aftertreatment. The reducing agent can be introduced into the mixing chamber by means of a metering device of the exhaust gas aftertreatment device. The mixing chamber has a wall which is on the input side as viewed in a main flow direction of the exhaust gas flow through the exhaust pipe. A first inlet for the exhaust gas is formed in the input-side wall. The first inlet extends in regions of a lateral surface region of the input-side wall in such a way that exhaust gas entering the mixing chamber through the first inlet can be set in rotary motion about the main flow direction inside the mixing chamber. In this case, the metering device has an outlet device, and a longitudinal axis of the outlet device is inclined counter to the main flow direction of the exhaust gas flow.

As a result of the first inlet extending in regions of the lateral surface region of the input-side wall and thus being oriented transversely to the main flow direction of the exhaust gas flow, a tangential inflow of the exhaust gas into the mixing chamber through the first inlet is achieved during operation of the exhaust gas aftertreatment device. This brings about angular momentum of the exhaust gas flow inside the mixing chamber, that is to say the rotary motion of the exhaust gas about the main flow direction inside the mixing chamber. The main flow direction coincides with an axial direction or a longitudinal direction of the exhaust pipe. Because of this swirling flow of the exhaust gas inside the mixing chamber, or because of the swirling of the exhaust gas entering the mixing chamber, a particularly long mixing distance is achieved even with a short length relative to the diameter of the exhaust pipe in which the mixing chamber is located. Even in the case of a short exhaust pipe, a very thorough mixing of the exhaust gas with the reducing agent can be ensured.

On account of the inclination of the longitudinal axis of the outlet device counter to the main flow direction of the exhaust gas flow being achieved, the reducing agent exiting the outlet device is supplied to the input-side wall of the mixing chamber where, because of the exhaust gas flow, a particularly high heat input into the mixing chamber is present.

This reduces the susceptibility of the mixing chamber to wetting with the reducing agent. The reducing agent may be in particular a urea-water solution, which is available, for example, under the brand name AdBlue®.

Wall films of the reducing agent that may have accumulated on an inner face of the input-side wall of the mixing chamber can also evaporate, or vaporize, particularly effectively. Deposits of components of the reducing agent can thus be avoided to a great extent, both in the region of the outlet device or nozzle and in a region of the mixing chamber that is remote from the nozzle.

Liquid portions of the reducing agent, which lead to wetting of regions of the mixing chamber, accordingly evaporate particularly well.

A particularly low and homogeneous surface load on the walls of the mixing chamber that are supplied with reducing agent can thus be achieved. In other words, when wetting occurs on the walls of the mixing chamber, it involves a load with a particularly small amount of reducing agent per unit area of the walls. This leads to a particularly low cooling of the mixing chamber and to a particularly effective evaporation of the amount of reducing agent introduced into the exhaust gas aftertreatment device. Furthermore, particularly high metering rates can thus be achieved without deposition of chemical secondary products when introducing the reducing agent into the mixing chamber by means of the metering device.

If aqueous urea solution is used as the reducing agent, ammonia is formed in the hot exhaust gas from the urea. A thorough mixing of the released ammonia up until the mixture enters an SCR catalyst makes possible a particularly substantial reaction of the nitrogen oxides in the SCR catalyst with the ammonia. In the SCR catalyst (SCR=selective catalytic reduction), the nitrogen oxide content in the exhaust gas is reduced in a selective catalytic reduction reaction by reacting the nitrogen oxides with ammonia to form nitrogen and water.

A urea preparation can thus be achieved in a flood with the catalysts or with the catalyst or substrate support without deposits forming or with a particularly substantial reduction in deposit formation, even in the case of particularly high metering rates and low temperature.

This also applies in the case of a short length relative to the diameter, which is unfavorable per se. The arrangement of the mixing chamber is suitable for use in series directly downstream of an oxidation catalyst and/or particulate filter or directly upstream of an SCR catalyst or upstream of a particulate filter provided with an SCR-active coating.

The longitudinal axis of the outlet device, or spray axis, can be arranged so as to be inclined at from approximately 15° to approximately 30°, in particular with respect to a cross-sectional plane of the exhaust pipe in which the mixing chamber is located. By virtue of such an inclination angle of the outlet device or nozzle with respect to a vertical axis of the mixing chamber, the reducing agent droplets can be injected against the input-side wall, relatively close to the outlet device or injection nozzle, where the droplets can evaporate particularly quickly.

Preferably, it is possible to supply the reducing agent by means of the outlet device to an inner face of a curved transition region between an end face region and the lateral surface region of the input-side wall. By virtue of such a rounded, i.e., corner- and edge-free, design of the input-side wall, droplets of the reducing agent remaining suspended on corners or edges and accumulating as a liquid wall film can be particularly substantially prevented. This also brings about a particularly low tendency for deposits to form. A baffle surface can be provided in a particularly simple manner on the input-side wall, which is designed in particular in the manner of a round shell, when the input-side wall of the mixing chamber is formed by deep-drawing of a corresponding metal component.

Preferably, it is possible to supply exhaust gas to an outer face of the input-side wall in the transition region. This exhaust gas, which subsequently passes via the first inlet into the mixing chamber, ensures particularly good heating or keeps the mixing chamber warm in the region in which the reducing agent is supplied to the input-side wall during operation of the exhaust gas aftertreatment device. This rear-face convection of exhaust gas in the region of the mixing chamber ensures a particularly large heat input into the mixing chamber where the reducing agent is supplied.

As a result of preferably at least the end face of the mixing chamber and at least the predominant region of the lateral surface of the mixing chamber being formed by the input-side wall, perturbations or edges can be avoided in a particularly large partial region of the mixing chamber. This, too, is conducive to preventing the formation of deposits.

It has been demonstrated to be further advantageous for a length of the first inlet measured in the main flow direction of the exhaust gas flow to be greater than a width of the first inlet measured perpendicularly to the main flow direction of the exhaust gas flow.

Such an elongate geometry of the first inlet allows the exhaust gas to flow into the mixing chamber at a favorable flow rate, and consequently to generate the angular momentum transversely to the main direction or main flow direction of the exhaust gas in the region of the mixing chamber.

Additionally or alternatively, the first inlet and the outlet device are arranged with an angular offset from each other of from approximately 40° to approximately 60° in a circumferential direction of the exhaust pipe. It can thus be ensured in a particularly simple manner that there is a swirling flow inside the mixing chamber in the region of the outlet device, that is to say the rotary motion of the exhaust gas inside the mixing chamber.

The first inlet is preferably arranged in this case upstream of the outlet device as viewed in a flow direction of the exhaust gas set in rotary motion.

For example, the first inlet may be arranged approximately 50° upstream of the outlet device or injection nozzle. The exhaust gas flow flowing through the exhaust pipe in the main flow direction can thus enter the mixing chamber in a particularly simple manner via the first inlet. Nevertheless, during operation of the exhaust gas aftertreatment device in the region of the outlet device, the exhaust gas is already set in rotary motion.

It is furthermore advantageous for the mixing chamber to have a second inlet in the region of the outlet device, via which inlet exhaust gas can be introduced into the mixing chamber. The second inlet is preferably designed as a substantially circular opening through which the longitudinal axis of the outlet device passes. A particularly unhindered entry of the exhaust gas via the second inlet into the mixing chamber is achievable if the opening is formed continuously, i.e., none of the edges of the opening has interconnecting bridges or the like. By introducing exhaust gas via an opening of this kind during operation of the exhaust gas aftertreatment device, it is possible to achieve a concentric envelope of the reducing agent or spray cone which can be introduced into the mixing chamber via the outlet device.

This is also particularly advantageous with regard to preventing the formation of deposits of the reducing agent.

The mixing chamber preferably has at least one third inlet arranged downstream of the outlet device as viewed in a flow direction of the exhaust gas set in rotary motion, via which inlet exhaust gas can be introduced into the mixing chamber. By means of one or more such third inlets, the reducing agent or the spray cone is particularly substantially shielded from the walls of the mixing chamber and distributed over a large area. As a result, deposition formation can be avoided.

The terms "second inlet" and "third inlet" are not to be understood as measure words in the present case; rather, they make it easier to distinguish the inlets from one another. In this respect, the second inlet and/or the third inlet may also be referred to as a "further inlet." This is true, for example, when only the first inlet and the second inlet or only the first inlet and at least one third inlet are provided.

Preferably, a length of the at least one third inlet measured in the main flow direction of the exhaust gas flow is greater than a width of the at least one third inlet measured perpendicularly to the main flow direction of the exhaust gas flow. Due to this elongate shape of the third inlet, the exhaust gas can enter the mixing chamber in a favorable manner in terms of flow.

Additionally or alternatively, the third inlet and the outlet device are arranged with an angular offset from each other of from approximately 20° to approximately 40° in a circumferential direction of the exhaust pipe. For example, the third inlet may be arranged approximately 30° downstream of the outlet device or nozzle and extend substantially in the longitudinal direction of the exhaust pipe, i.e., in the main flow direction of the exhaust gas flow. The at least one third inlet thus also helps to prevent the formation of deposits.

A sum of the inlet cross sections through which gas can flow preferably corresponds to from approximately 15% to approximately 50% of an exhaust pipe cross section through which gas can flow. This makes it possible for the exhaust gas to enter the mixing chamber in a particularly unhindered manner and so as to lead to a thorough mixing of the reducing agent with the exhaust gas flow.

An outlet for the exhaust gas is preferably provided in an output-side wall of the mixing chamber. An outlet of this kind facilitates the formation of vortices in the exhaust pipe and therefore the thorough mixing of the reducing agent with the exhaust gas flow. The arrangement, shape and orientation of the outlet opening facilitate the swirling flow in the mixing chamber.

Furthermore, downstream of the output-side wall of the mixing chamber, a wall element may be arranged in the exhaust pipe, which element has a plurality of passage openings and which abuts the circumference of an inner face of the exhaust pipe. A wall element of this kind, designed in the manner of a perforated plate, is also conducive to the intensive mixing of the reducing agent with the exhaust gas.

For such thorough mixing, it is also beneficial for a gap to be formed between the mixing chamber and the wall element.

The features and feature combinations mentioned above in the description as well as the features and feature combinations mentioned below in the description of the drawings and/or shown alone in the drawings can be used not only in the respectively specified combinations but also in other combinations or in isolation, without departing from the scope of the invention. The invention may therefore also be considered to comprise and disclose embodiments which are not explicitly shown or explained in the drawings but which emerge and can be produced by separate feature combinations from the embodiments explained. Embodiments and feature combinations which do not have all the features of an originally formulated independent claim may therefore also be considered to be disclosed. Moreover, embodiments and feature combinations which go beyond the feature combinations outlined in the dependency references of the claims or deviate therefrom are considered to be disclosed, in particular by the embodiments outlined above.

Further advantages, features and details of the invention can be found in the claims, the following description of preferred embodiments and with reference to the drawings.

BRIEF DESCRIPTION OF THE DRAWINGS

FIG. 20 shows further possibilities for arranging the mixing chamber in the exhaust system when the system is oriented substantially vertically.

DETAILED DESCRIPTION OF THE DRAWINGS

Figure 1:
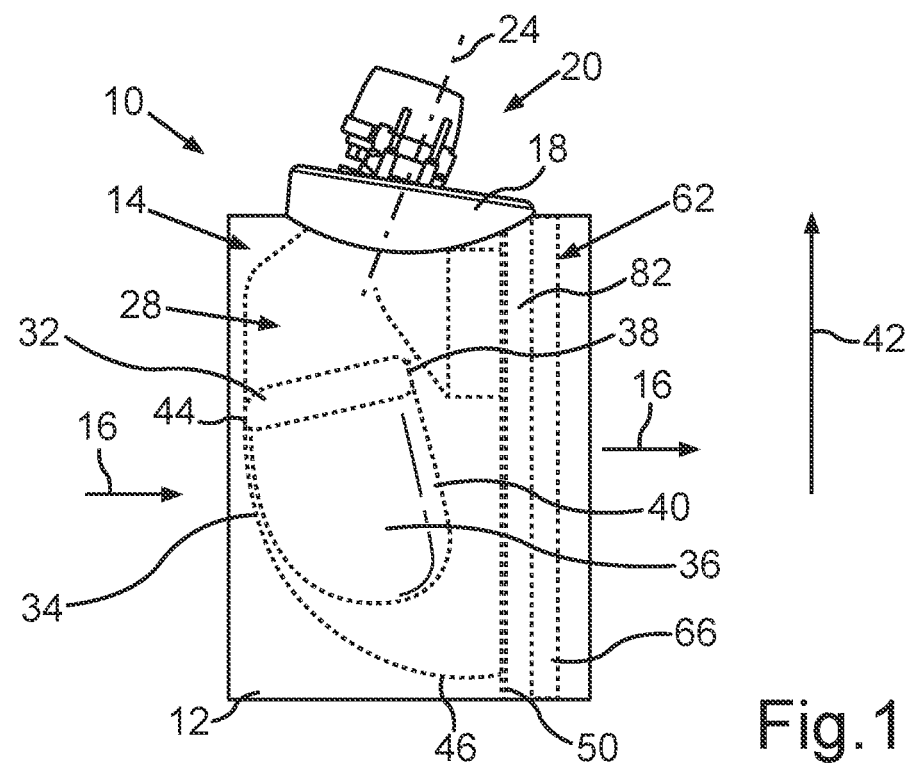
FIG. 1 is a side view of components of an exhaust gas aftertreatment device for a motor vehicle, a mixing chamber being arranged in an exhaust pipe.

FIG. 1 shows a detail of an exhaust pipe 12 of an exhaust gas aftertreatment device 10 for a motor vehicle, which may be in particular a commercial vehicle. A mixing chamber 14 is arranged inside the exhaust pipe 12. A main flow direction 16 of an exhaust gas flow through the exhaust pipe 12 during operation of the exhaust gas aftertreatment device 10 is illustrated by arrows in FIG. 1. The main flow direction 16 of the exhaust gas corresponds to an axial direction of the exhaust pipe 12 and thus coincides with a longitudinal axis of the exhaust pipe 12.

In the region of the mixing chamber 14, however, the flow direction of the exhaust gas deviates from this main flow direction 16. This is because the mixing chamber 14 is oriented transversely to the main flow direction 16. A metering device 20 is arranged on a cover part 18 which is connected to the exhaust pipe 12. This metering device 20 may be an atomizer, in particular a mechanical atomizer. The metering device 20 comprises an outlet device 22 (cf. FIG. 5) which can be designed, for example, as a nozzle. A longitudinal axis 24 of the outlet device 22 is illustrated in FIG. 1. Accordingly, it is apparent that the longitudinal axis 24 is inclined. The longitudinal axis 24 is inclined counter to the main flow direction 16 of the exhaust gas flow. Consequently, during operation of the exhaust gas aftertreatment device 10, a reducing agent 26 (cf. FIG. 5), for example in the form of an aqueous urea solution, does not exit the metering device 20 perpendicularly to the main flow direction 16. Rather, the reducing agent 26 is supplied to an input-side wall 28 of the mixing chamber 14 (cf. FIG. 6) and is introduced into the mixing chamber 14 by means of the metering device 20.

By injecting the reducing agent 26 into the mixing chamber 14 counter to the main flow direction 16 of the exhaust gas flow, the reducing agent 26 is supplied to a region of the input-side wall 28 of the mixing chamber 14 in a targeted manner, around which region the exhaust gas impinging on the mixing chamber 14 flows particularly effectively. This leads to a very substantial evaporation of a wall film of the reducing agent 26 which film may accumulate on an inner face 30 (cf. FIG. 6) of the input-side wall 28.

The input-side wall 28 or the entry plate (see FIG. 7) of the mixing chamber 14 is preferably produced by deep-drawing a sheet metal material. Accordingly, this input-side wall 28 is rounded and free of corners and edges, such that there is a particularly low tendency for the formation of deposits of the reducing agent 26.

The exhaust gas can enter the mixing chamber 14 from the exhaust pipe 12 via a first inlet 32 which is formed in the input-side wall 28. Here, the first inlet 32 extends from an end face region 34 of the mixing chamber 14, which region is formed by the inlet-side wall 28, up to a lateral surface region 36 of the mixing chamber 14. The lateral surface region 36 of the mixing chamber 14 is at least predominantly formed by the input-side wall 28 (cf. FIG. 7).

The mixing chamber 14 has a recess 40 in the lateral surface region 36 at the level of a downstream edge 38 of the first inlet 32. The exhaust gas which flows in the main flow direction 16 through the exhaust pipe 12 and enters the mixing chamber 14 impinges on this recess 40, which is designed in the manner of a step. Accordingly, the exhaust gas may enter the mixing chamber 14 via the inlet 32 such that the exhaust gas is subjected to angular momentum inside the mixing chamber 14. The exhaust gas is thus set in rotary motion about the main flow direction 16 in the mixing chamber 14. The cross-sectional area or the entry cross-section of the first inlet 32 is oriented transversely to the main flow direction 16 of the exhaust gas. In addition, the entry cross section, that is to say the first inlet 32 cross section, through which gas can flow, is inclined with respect to a vertical direction 42 of the mixing chamber 14. It is conceivable for the first inlet 32 cross section, through which gas can flow, to be parallel with respect to a vertical direction 42 of the mixing chamber 14.

The vertical direction 42 lies in a cross-sectional area of the exhaust pipe 12 and coincides with a vertical axis or vehicle vertical axis of the motor vehicle when the exhaust pipe 12 is oriented substantially horizontally. Due to the inclination of the entry cross section of the first inlet 32 with respect to the vertical direction 42, an input-side edge 44 of the first inlet 32 is closer to the longitudinal axis or central axis of the exhaust pipe 12 than the output-side edge 38 of the first inlet 32.

This inclined orientation of the first inlet 32 is due to the deep-drawing of the input-side wall 28 during the production thereof. In addition, this production results in a deepest point 46 of the mixing chamber 14 being located upstream of an output-side wall or an exit plate 48 (cf. FIG. 7) of the mixing chamber 14, of which plate a flange 50 can be seen in FIG. 1. The deepest point 46 of the mixing chamber 14 is thus not in the region of an edge or the like of the outlet plate 48 and the exhaust gas therefore flows around the point 48 particularly effectively. The associated heating likewise leads, to a particularly significantly reduced formation of deposits of the reducing agent 26 during operation of the exhaust gas aftertreatment device 10.

In the present case, the flow of the exhaust gas entering the mixing chamber 14, that is to say the exhaust gas flow, is divided several times into different inlets. Due to the arrangement and orientation of the first inlet 32, the angular momentum is generated transversely to the main direction or the main flow direction 16. The first inlet 32 is formed predominantly in the lateral surface or the lateral surface region 36 of the input-side wall 28, but the input-side edge 44 of the first inlet 32 adjoins the end face region 34 of the input-side wall 28.

A further or second inlet 52 is formed in the region of a cover plate 54 (cf. FIG. 7) of the mixing chamber 14, which plate delimits the top of the mixing chamber 14 in the region of the metering device 20. The reducing agent 26 enters the mixing chamber 14 via the inlet 52 in the cover plate 54 (cf. FIG. 6). This second inlet 52 is formed as a circular opening through which the longitudinal axis 24 of the outlet device 22 passes. Accordingly, the spray cone of the reducing agent 26 exiting the outlet device 22 is enveloped concentrically by exhaust gas, which is guided via the second inlet 52 into the mixing chamber. The second inlet 52 is arranged on the lateral surface of the mixing chamber 14, downstream of the first inlet 32 as viewed in a swirl direction of the exhaust gas set in rotary motion.

Figure 2:
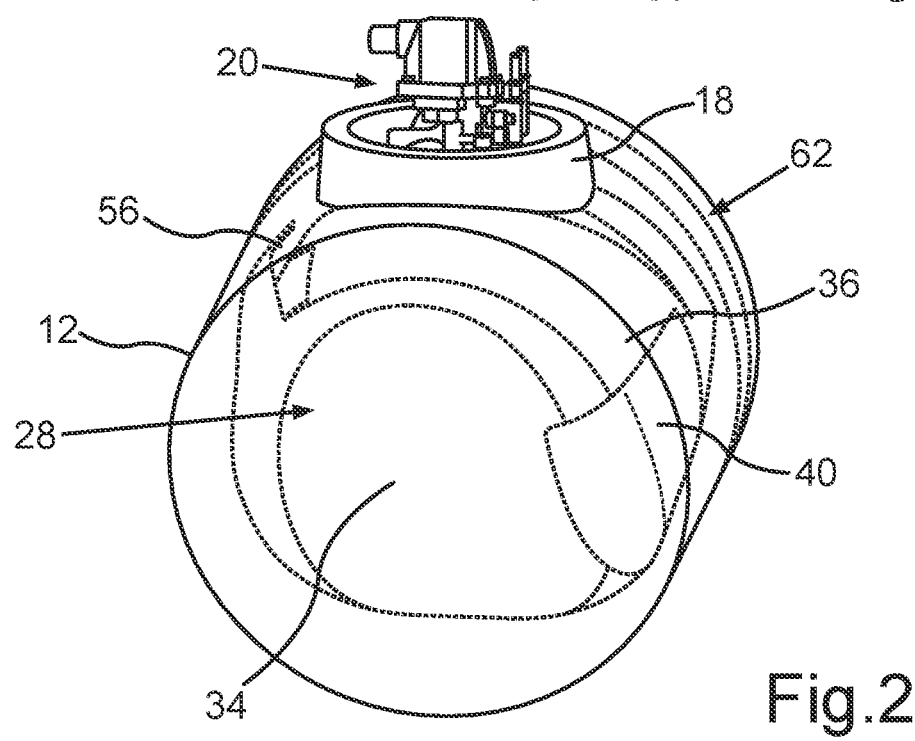
FIG. 2 is a perspective view of the exhaust pipe comprising the mixing chamber according to FIG. 1, it being possible to see the outer face of an input-side wall of the mixing chamber.

It is apparent for example from FIG. 2 that the mixing chamber 14 has a third inlet 56. This third inlet 56 is formed in part by the input-side wall 28 and in part by the cover plate 54 (cf. FIG. 7). Specifically, the cover plate 54 comprises a first part 58 in which the second inlet 52 is formed and which is formed like a saddle, and a second part 60 (see FIG. 7). These two parts 58, 60, which delimit the sides of the third inlet 56 in regions, are connected to the input-side wall 28, or the entry plate on one side and the exit plate 48 on the other side, for example by means of spot welding. In this case, initially the input-side wall 28 or the entry plate can be connected to the outlet plate 48. The cover plate 54, which comprises the two parts 58, 60, can then be arranged on top of this bond.

By means of the exhaust gas which enters the mixing chamber 14 via the third inlet 56, the spray cone of the reducing agent 26 inside the mixing chamber 14 is shielded from the walls thereof and distributed over a very large area.

Figure 3:
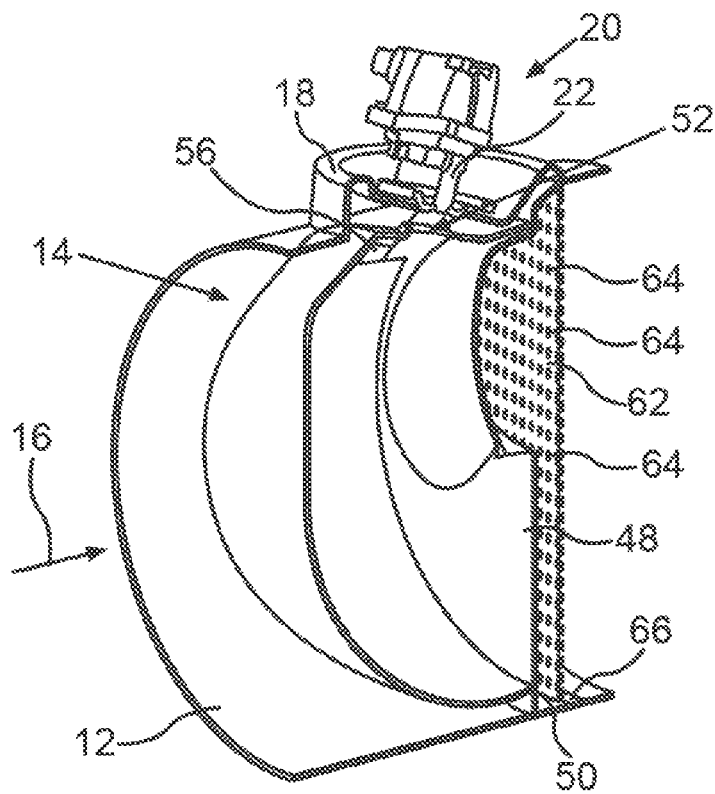
FIG. 3 is a sectional view of the components shown in FIG. 1.

The inclined orientation of the longitudinal axis 24 of the outlet device 22 with respect to the main flow direction 16 is clearly visible from FIG. 3. Furthermore, it can be seen in FIG. 3 that a spacing is provided between a nozzle-shaped end of the outlet device 22 and the inlet 52. Downstream of the mixing chamber 14, a wall element in the form of a perforated plate 62 is arranged in the exhaust pipe 12, which plate has a large number of passage openings 64. In the region of a flange 66 of the perforated plate 62, the perforated plate 62 is connected to an inner face of the exhaust pipe 12.

Figure 4:
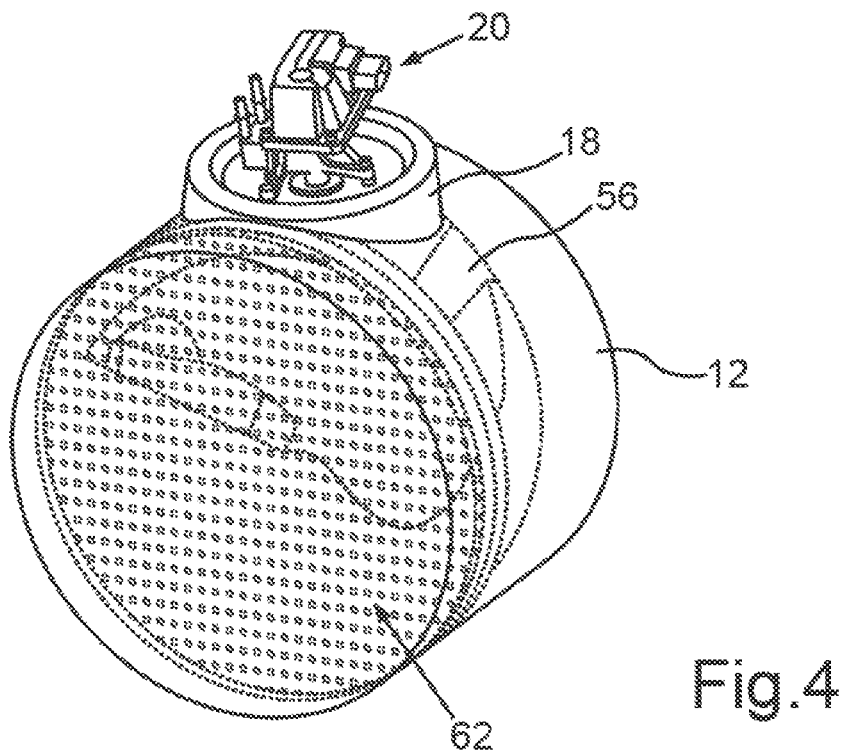
FIG. 4 shows the components shown in FIG. 1 in a perspective view of an outlet side of the mixing chamber.

FIG. 4 shows the mixing chamber 14 in the exhaust pipe 12 in a perspective view of the perforated plate 62.

Figure 5:
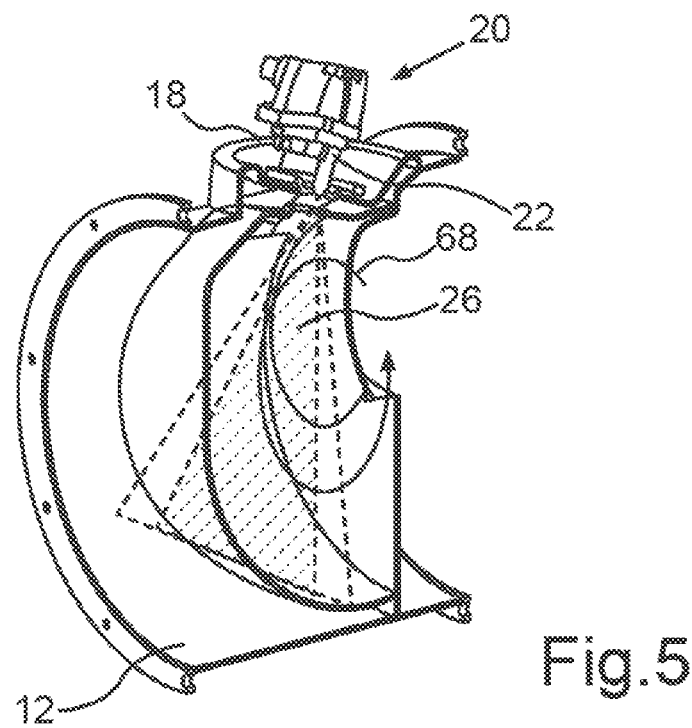
FIG. 5 shows a further, perspective sectional view of the exhaust pipe comprising the mixing chamber, a spray cone of a reducing agent introduced into the mixing chamber additionally being shown.

The perforated plate 62 is not shown in FIG. 5; however, an arrow 68 indicates the swirling flow of the exhaust gas through the mixing chamber 14.

Figure 6:
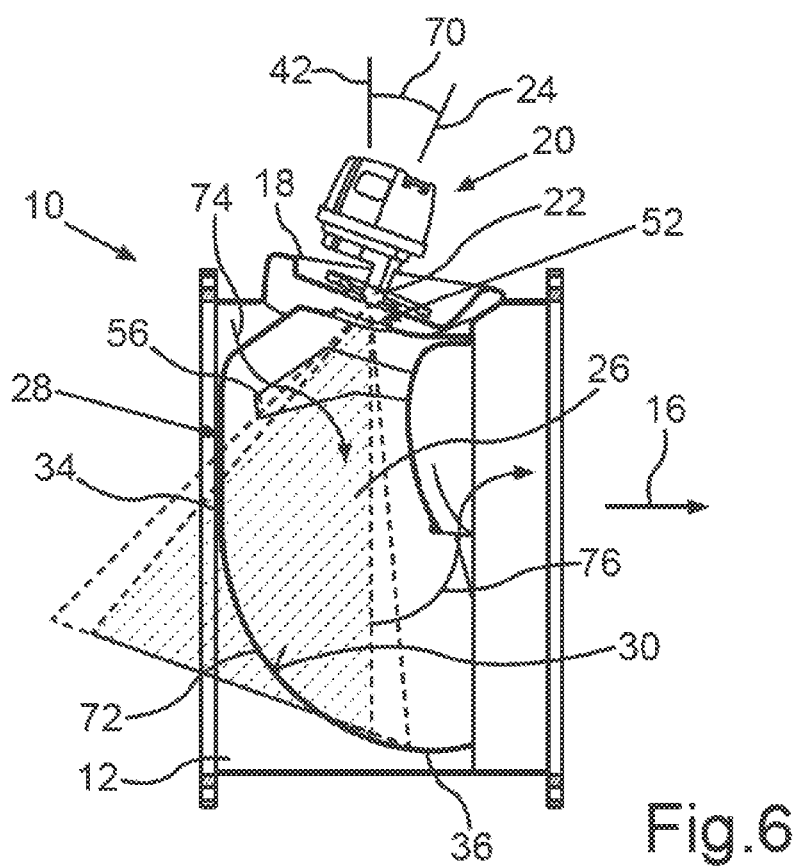
FIG. 6 is a sectional side view of the exhaust pipe comprising the mixing chamber according to FIG. 5.

FIG. 6 illustrates an angle 70 at which the longitudinal axis 24 of the outlet device 22 is inclined with respect to the vertical direction 42 of the mixing chamber 14 or with respect to the cross-sectional area of the exhaust pipe 12. The angle 70 may be, for example, approximately 20° and is preferably in the range of approximately 15° to approximately 30° with respect to the cross-sectional area of the exhaust pipe 12, which cross section is oriented perpendicularly to the main flow direction 16.

It is also apparent from FIG. 6 that, during operation of the exhaust gas aftertreatment device 10, the reducing agent 26 is supplied by means of the outlet device 22 in particular to the inner face 30 of a curved transition region 72 of the inlet-side wall 28, which region is formed between the end face region 24 and the lateral surface region 36 of the input-side wall 28. In the present case, the end face region 34 should be understood to mean, in particular, that region of the mixing chamber 14 which, with respect to the main flow direction 16, is substantially perpendicular or inclined at less than 45°. In contrast, the lateral surface region 36 is inclined at preferably more than 45° with respect to the main flow direction 16.

A baffle surface of the mixing chamber 14 is provided in the transition region 72, to which surface the reducing agent 26 is supplied in a targeted manner. Here, however, the back or rearward convection, i.e., the flow of exhaust gas around the inlet-side wall 28 of the mixing chamber 14, ensure a particularly high heat input into the mixing chamber 14. Accordingly, there is a particularly low susceptibility to wetting in this transition region 72, and any wall film of the reducing agent 26 that may have accumulated can evaporate effectively.

In addition, in FIG. 6, an arrow 74 indicates the entry of the exhaust gas via the third inlet 56 into the mixing chamber 14, and a further arrow 76 indicates the exit of the exhaust gas from the mixing chamber 14. Due to the swirling flow of the exhaust gas inside the mixing chamber 14, very high flow rates of the exhaust gas occur near the walls of the mixing chamber 14. Furthermore, the swirl or vortex when flowing through the mixing chamber 14 ensures a particularly long flow path to an outlet 78 of the mixing chamber 14, which outlet is formed in the exit plate 48 (cf. FIG. 7).

Figure 7:
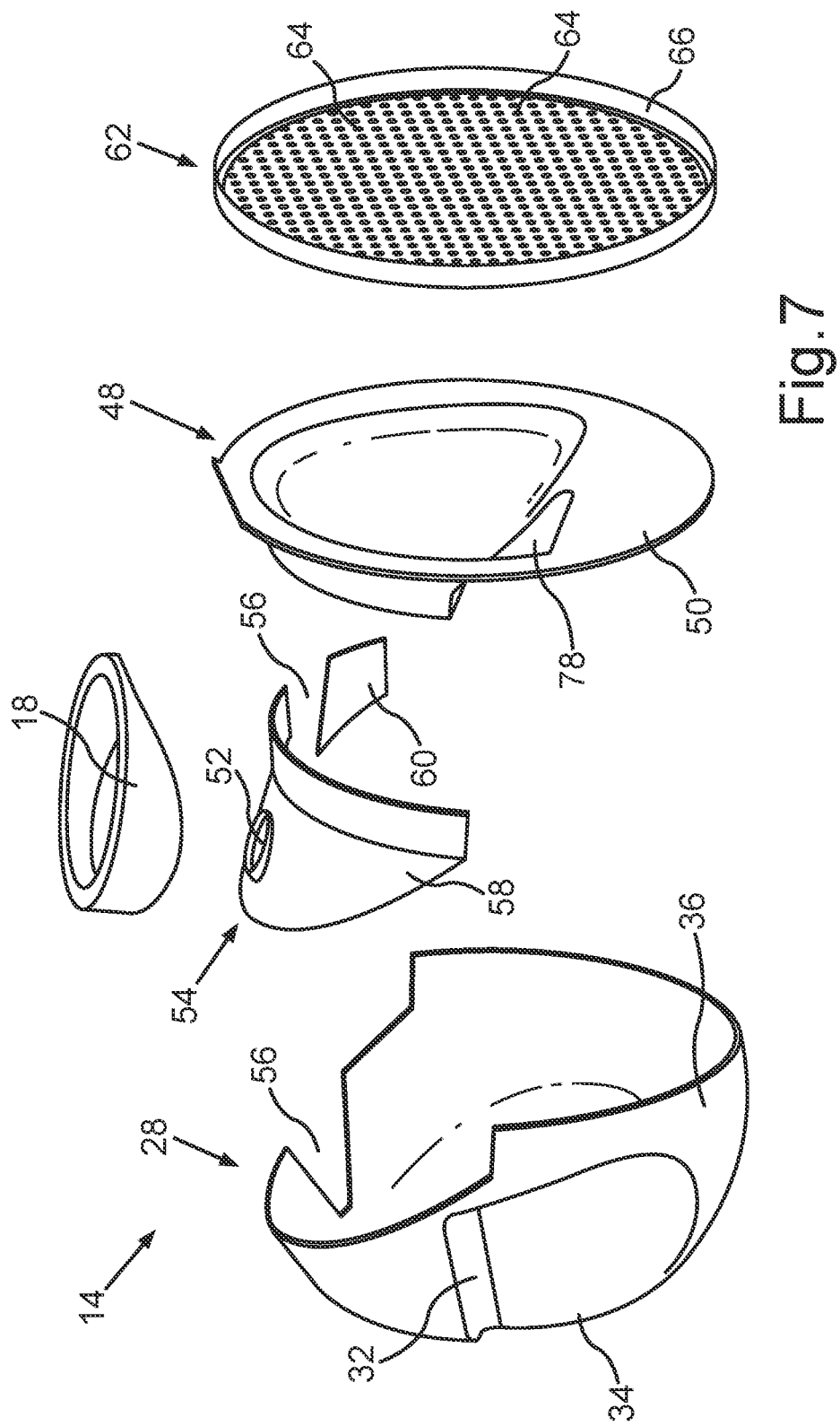
FIG. 7 shows individual components of the mixing chamber and a perforated plate arranged downstream of the mixing chamber.

Furthermore, the round, i.e., corner-free and edge-free, shape of the entry plate or of the input-side wall 28 is particularly evident in FIG. 7. In addition, it is apparent from FIG. 7 that the mixing chamber 14 is provided by a small number of simple components in a compact design. This is associated with cheap manufacturing. The cover part 18 is used for holding the metering device 20 and prevents leakage of reducing agent 26 or exhaust gas into the surroundings of the exhaust pipe 12, even though there is a certain distance between the second inlet 52 and the end of the outlet device 22.

Figure 8:
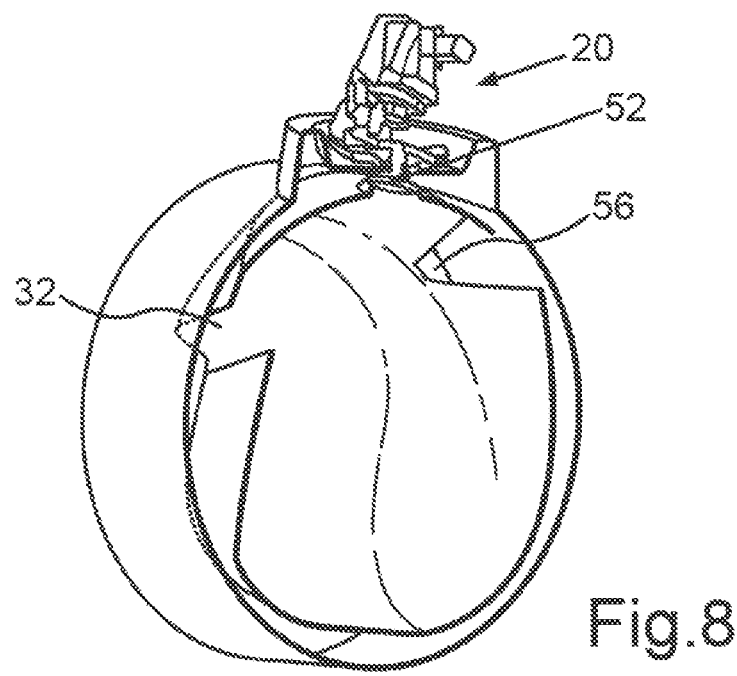
FIG. 8 is a further sectional view of the mixing chamber and the exhaust pipe in which the mixing chamber is arranged.

The first inlet 32 is particularly visible in FIG. 8 and is used to generate the angular momentum of the exhaust gas flow inside the mixing chamber 14. Furthermore, the second inlet 52 is shown in FIG. 8 in section; it is formed in the cover plate 54 and allows the spray jet of the reducing agent 26 to enter the mixing chamber 14. It is apparent from FIG. 8 that the wall flow, i.e., the flow of the exhaust gas along the inner face of the mixing chamber 14, can be achieved via the third inlet 56, which is formed partly in the inlet-side wall 28 and partly in the cover plate 54.

Figure 9:
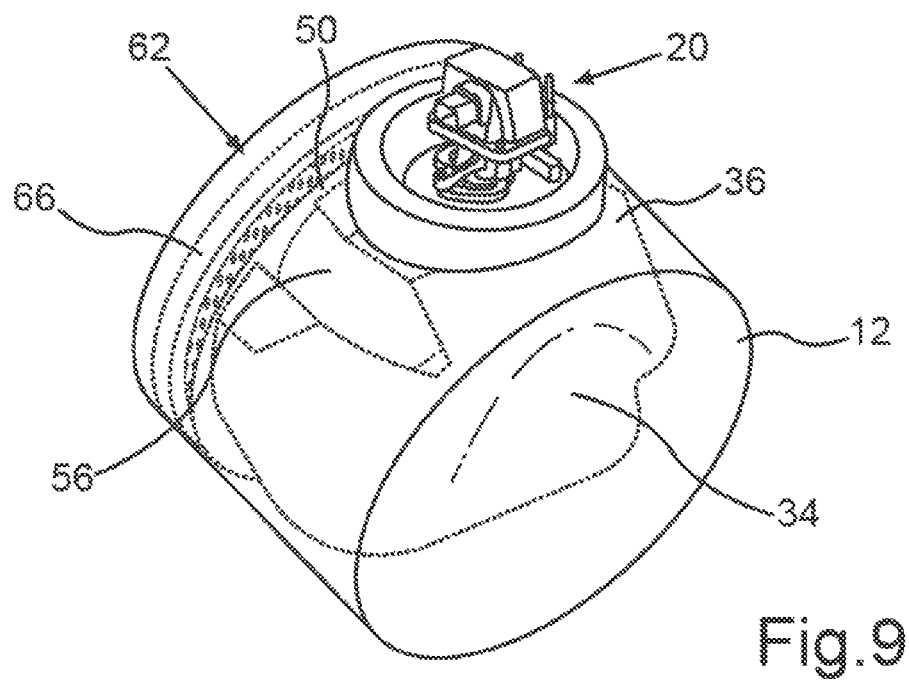
FIG. 9 is a further perspective view of the exhaust pipe comprising the mixing chamber arranged therein.

It is apparent from FIG. 9 that the third inlet 56 extends as far as the exit plate 48, the flange 50 of which can be seen in FIG. 9. In addition, it can be seen that the third inlet 56 initially widens somewhat in the lateral surface region 36 of the input-side wall 28 adjoining the end-face region 34 and then becomes somewhat narrower again.

Figure 10:
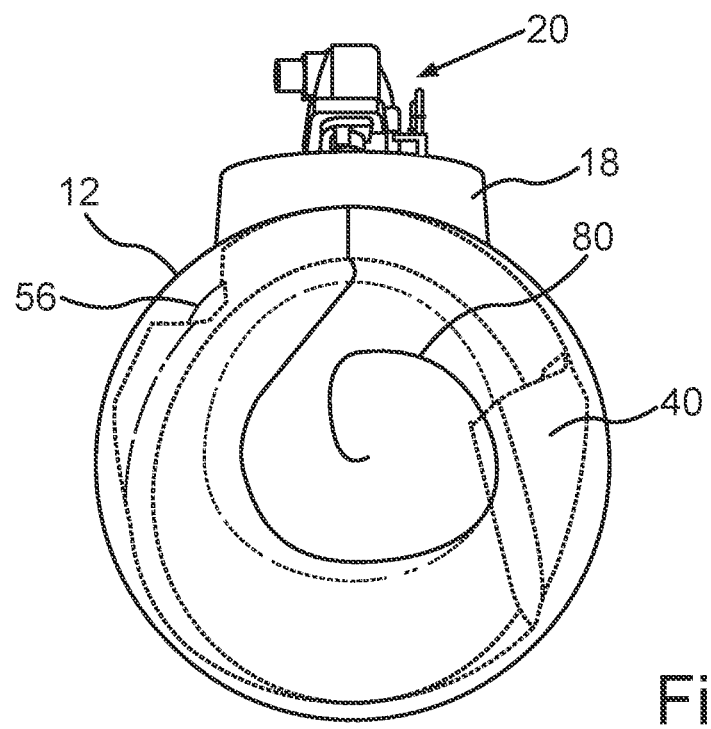
FIG. 10 is a rear view of the mixing chamber in the exhaust pipe, illustrating a flow path of the reducing agent through the mixing chamber.

In FIG. 10, another arrow 80 indicates the long, spirally wound path of the reducing agent 26, or the mixture of the reducing agent 26 and the exhaust gas, in the mixing chamber 14 toward the outlet 78 which is formed in the exit plate 48.

Figure 11:
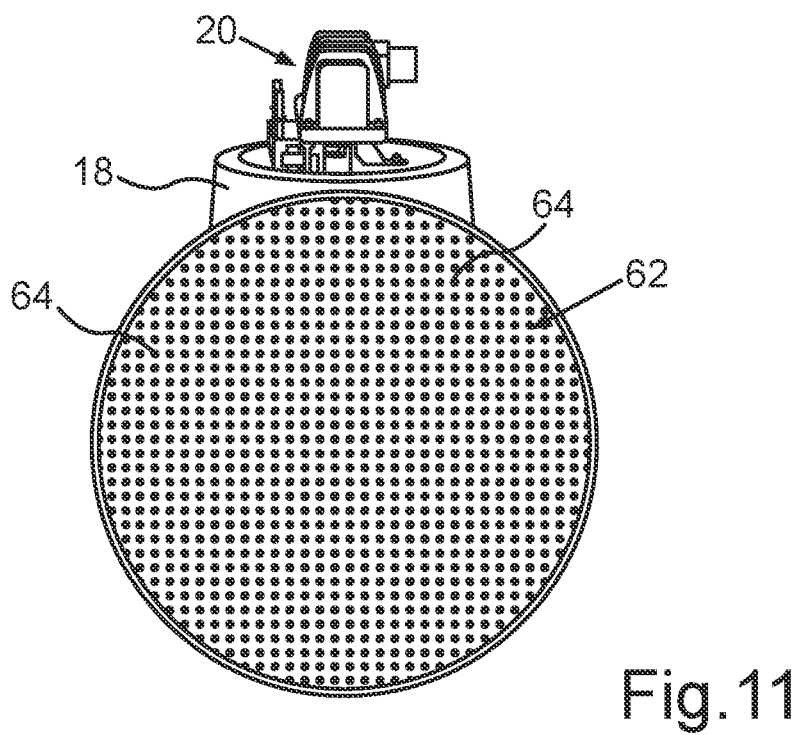
FIG. 11 is a view of an outlet side of the mixing chamber in the exhaust pipe.

The contribution of the small passage openings 64 or holes in the perforated plate 62 for further, intensive mixing of the reducing agent, or the ammonia formed from the urea, with the exhaust gas is apparent from FIG. 11.

Figure 12:
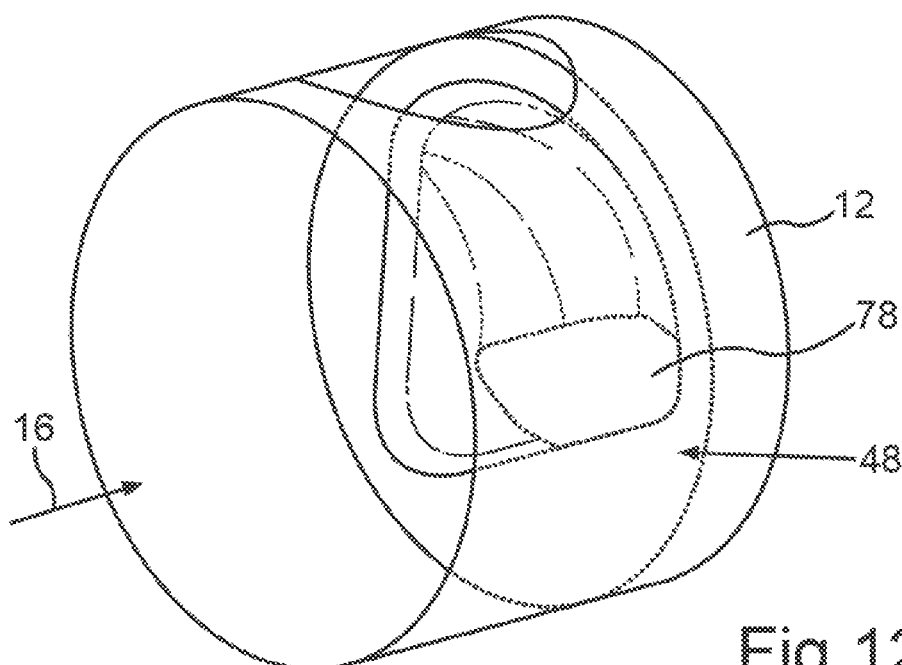
FIG. 12 shows the exhaust pipe according to FIG. 1 in a perspective view, a view from the inside of an exit plate of the mixing chamber being shown.

FIG. 12 is a perspective view of the outlet plate 48 as viewed in the main flow direction 16 of the exhaust gas through the exhaust pipe 12, the input-side wall 28 and the cover plate 54 of the mixing chamber 14 not being shown in FIG. 12. The outlet 78 formed in the exit plate 48 contributes to the swirling of the exhaust gas and to the thorough mixing of the exhaust gas with the reducing agent 26.

Figure 13:
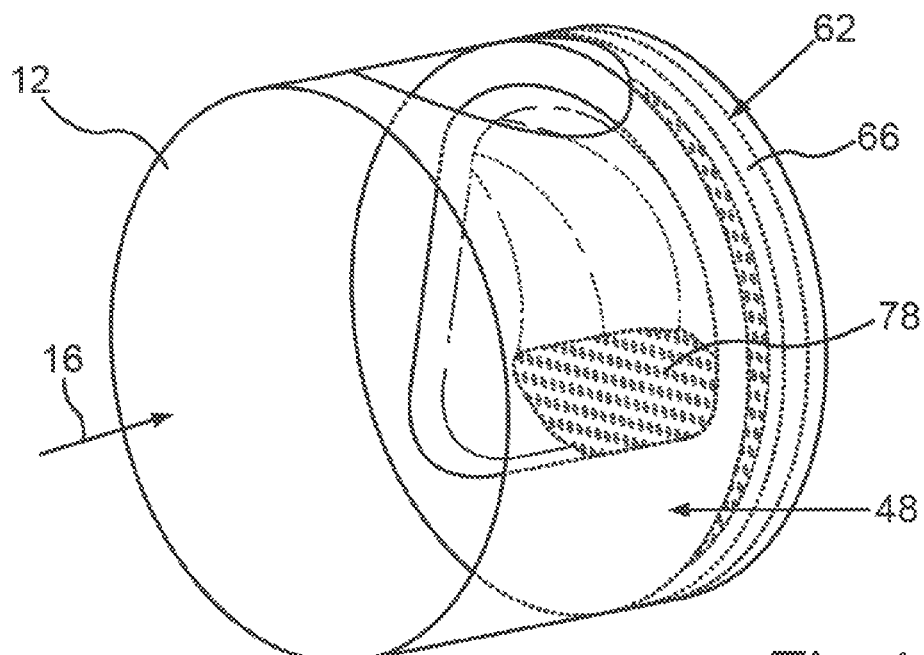
FIG. 13 is a view according to FIG. 12 but comprising the perforated plate arranged downstream of the exit plate.

FIG. 13 shows the view according to FIG. 12 but with the perforated plate 62 arranged in the exhaust pipe 12 being additionally shown. The outlet 78 thus further supports the angular momentum of the exhaust gas upon exiting the mixing chamber 14. Furthermore, the perforated plate 62 ensures effective thorough mixing of exhaust gas and reducing agent 26.

Figure 14:
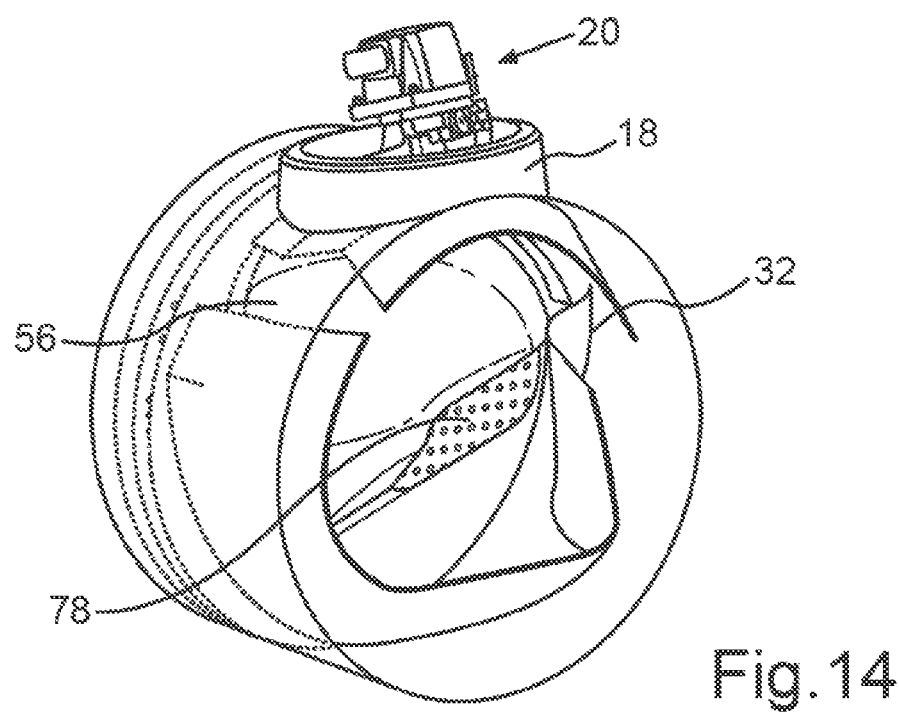
FIG. 14 is a further sectional view of the exhaust pipe comprising the mixing chamber arranged therein.

The spatial arrangement of the first inlet 32, the third inlet 56 and the outlet 78 relative to one another is apparent from the sectional view in FIG. 14.

Figure 15:
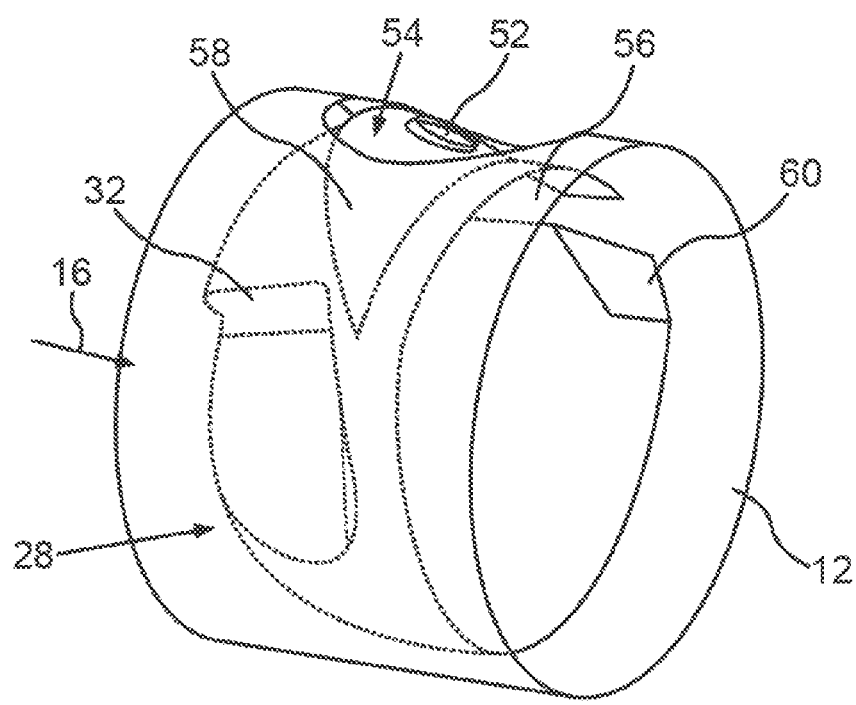
FIG. 15 is a further sectional view of the exhaust pipe and of components of the mixing chamber.

FIG. 15 shows particularly well how the third inlet 56 is provided such that the parts 58, 60 of the cover plate 54 cooperate with the input-side wall 28 of the mixing chamber 14.

Figure 16:
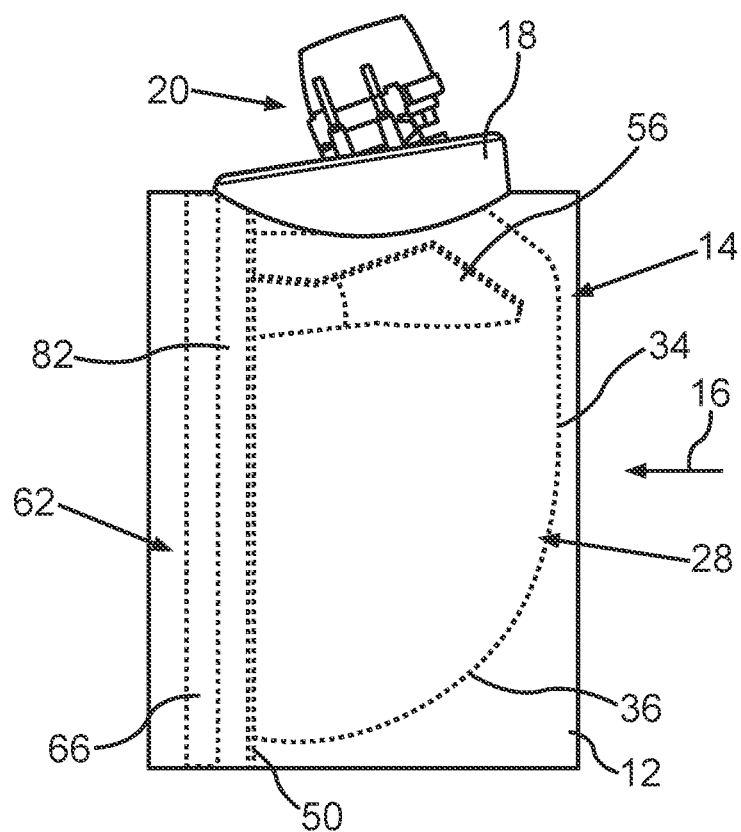
FIG. 16 is a further side view of the mixing chamber arranged in the exhaust pipe.

The shape of the third inlet 56 is particularly apparent from FIG. 16, in particular it is apparent that the third inlet 56 as seen in the main flow direction 16 of the exhaust gas through the exhaust pipe 12 initially widens and then narrows. It can also be seen that a gap 82 is formed between the exit plate 48 of the mixing chamber 14 and the perforated plate 62. This also serves to improve the thorough mixing of the reducing agent 26 with the exhaust gas.

Figure 17:
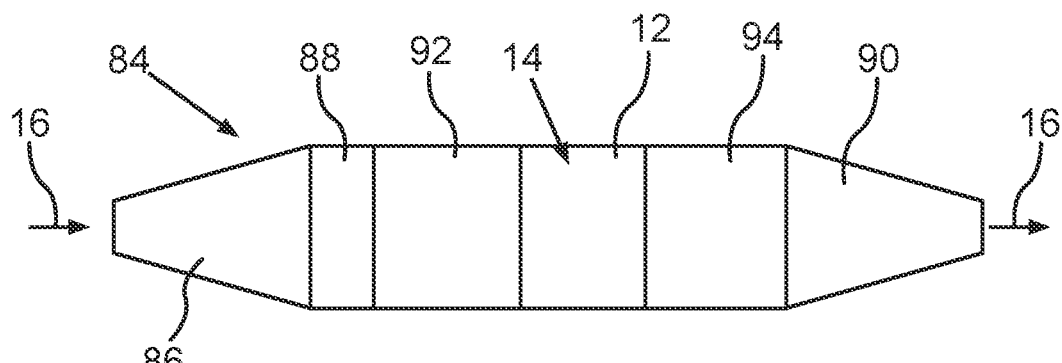
FIG. 17 shows a possible type of arrangement of the mixing chamber in an exhaust tract of the motor vehicle.

FIG. 17 is an exemplary and schematic representation of the arrangement of the exhaust pipe 12 comprising the mixing device or mixing chamber 14 inside an exhaust system 84 of the motor vehicle. The exhaust system 84 may for instance have an inlet funnel 86. In the case of the motor vehicle being designed as a heavy goods vehicle, a diameter of the exhaust system 84 in the region of the inlet funnel 86 can widen from, for example, 130 mm to, for example, 13 inches. An oxidation catalyst 88, in particular a diesel oxidation catalyst, can be connected to the inlet funnel 86 in the main flow direction 16. In the region of the oxidation catalyst 88 and as far as an outlet funnel 90, the exhaust system 84 according to the schematic illustration in FIG. 17 has a constant diameter. A particulate filter 92, in particular a diesel particulate filter, is arranged downstream of the oxidation catalyst 88. In this case, the exhaust pipe 12 comprising the mixing chamber 14 is attached to the filter. An SCR catalyst 94 is then arranged in the exhaust system 84, downstream of the exhaust pipe 12. Additionally, an ammonia slip catalyst may be arranged in the exhaust system 84, upstream of the outlet funnel 90.

In the case of such an arrangement in series, the exhaust pipe 12 comprising the mixing chamber 14 occupies only a very small length, for example a length of only 10 inches. In particular, in the case of the exhaust pipe 12 comprising the mixing chamber 14 being arranged in a light commercial vehicle or, for example, a passenger vehicle, the dimensions deviate from those mentioned here. Accordingly, it is possible to scale down, as appropriate, the exhaust system 84 which is described by way of example with reference to FIG. 17.

Figure 18:
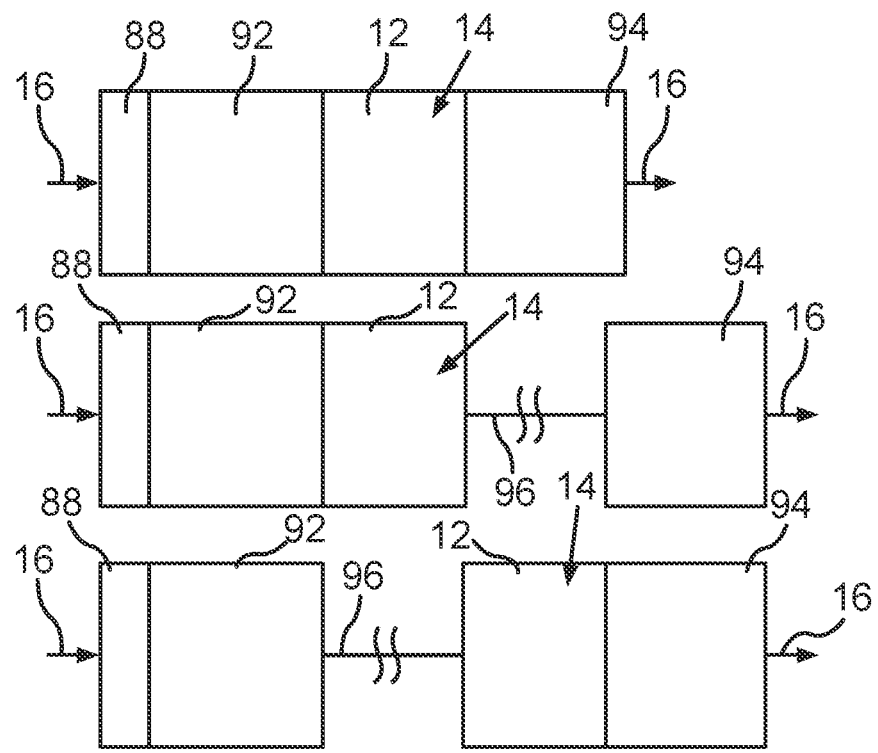
FIG. 18 shows possibilities for arranging the mixing chamber when the exhaust system is oriented substantially horizontally and the particulate filter is arranged upstream of the mixing chamber.

The top of FIG. 18 shows a first arrangement in which, in accordance with FIG. 17, the oxidation catalyst 88, the particulate filter 92, the exhaust pipe 12 comprising the mixing chamber 14, and the SCR catalyst 94 directly adjoin one another. Accordingly, these catalysts and the mixing chamber 14 are arranged in an exhaust line that has a specific diameter. In a further view, shown in the middle of FIG. 18, a separate pipe section 96 is arranged between the exhaust pipe 12 and the SCR catalyst 94 or the combination of the SCR catalyst 94 with the ammonia slip catalyst. In the case of such a divided arrangement of the exhaust gas cleaning components in respective housings or boxes, a more flexible accommodation in the motor vehicle is made possible.

The same applies to an arrangement shown schematically at the bottom in FIG. 18, in which the pipe section 96 is located between the particulate filter 92 and the exhaust pipe 12. However, in all three options shown in FIG. 18 of accommodation of the mixing chamber 14, the orientation of the exhaust system 84 is overall substantially horizontal such that the main flow direction 16 is likewise horizontal.

Figure 19:
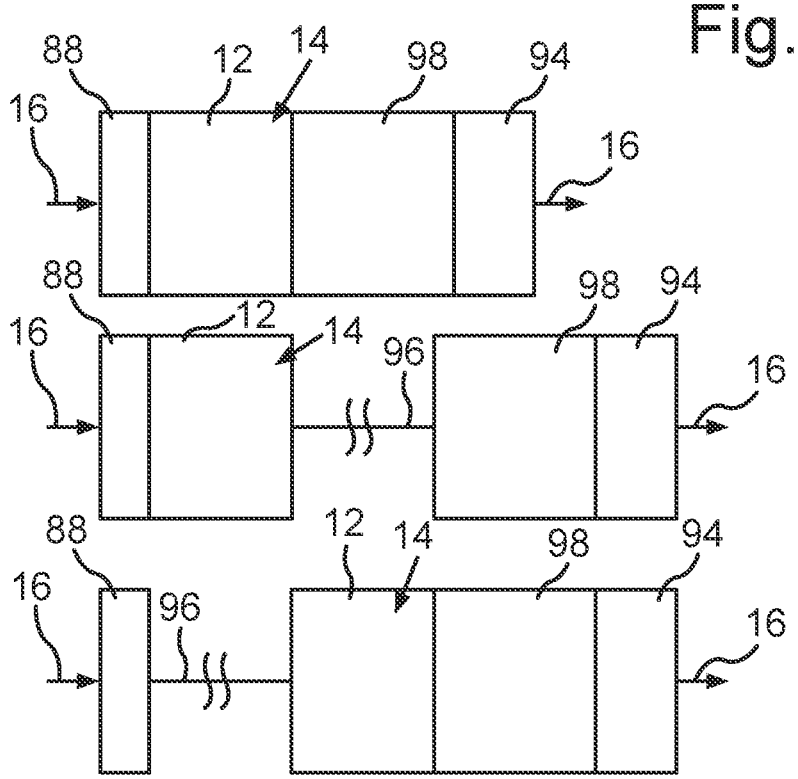
FIG. 19 shows further possibilities for arranging the mixing chamber in the exhaust system when the system is oriented substantially horizontally and when the mixing chamber is arranged upstream of an SCR-coated particulate filter.

The same applies to three further arrangements, which are shown in FIG. 19. In this case, however, the exhaust pipe 12 comprising the mixing chamber 14 is arranged upstream of an SCR-coated particulate filter 98. Such an exhaust gas aftertreatment element is also referred to as an SCRF catalyst (SCRF=SCR on filter, particulate filter having an SCR coating). In the arrangement shown at the top of FIG. 19, the oxidation catalyst 88, the exhaust pipe 12 comprising the mixing chamber 14, the coated particulate filter 98 and the SCR catalyst 94 or the combination of the SCR catalyst 94 with the ammonia slip catalyst are in a common housing or a common exhaust line.

In contrast, in the view shown in the middle of FIG. 19, the separate pipe section 96 is provided between the coated particulate filter 98 and the exhaust pipe 12 comprising the mixing chamber 14. In the view shown at the bottom of FIG. 19, in contrast, the separate pipe section 96 is provided between the oxidation catalyst 88 and the exhaust pipe 12 comprising the mixing chamber 14.

FIG. 20 shows further arrangements in which the exhaust system 84 is oriented substantially vertically. Accordingly, the main flow direction 16 does not coincide, as in FIGS. 18 and 19, substantially with the vehicle longitudinal direction or vehicle transverse direction, but rather with the vehicle vertical direction or vehicle vertical axis. However, intermediate positions between the vertical and the horizontal orientation, and combinations of such orientations, are also possible.

In the arrangement shown on the left of FIG. 20, the mixing chamber 14 is arranged between the particulate filter 92 and the SCR catalyst 94, and is arranged in a common housing or a common exhaust line comprising the exhaust pipe 12 as a partial piece thereof. When the exhaust system 84 is oriented in the vehicle vertical direction, the longitudinal axis 24 of the outlet device 22 is likewise inclined counter to the main flow direction 16. However, the vertical axis or vertical direction 42 of the mixing chamber 14 (cf. FIG. 1) then extends substantially horizontally in the motor vehicle.

In the arrangement shown on the right in FIG. 20, the exhaust pipe 12 comprising the mixing chamber 14 is arranged upstream of the coated particulate filter 98. In the vertical arrangement of the individual components of the exhaust system 84, which is illustrated schematically in FIG. 20, separate pipe sections 96 may too be provided at the respective locations, as illustrated in FIGS. 18 and 19.

LIST OF REFERENCE CHARACTERS 10 exhaust gas aftertreatment device
12 exhaust pipe
14 mixing chamber
16 main flow direction
18 cover part
20 metering device
22 outlet device
24 longitudinal axis
26 reducing agent
28 wall
30 inside
32 inlet
34 end face region
36 lateral surface region
38 edge
40 recess
42 vertical direction
44 edge
46 point
48 exit plate
50 flange
52 inlet
54 cover plate
56 inlet
58 part
60 part
62 perforated plate
64 passage opening
66 flange
68 arrow
70 angle
72 transition region
74 arrow
76 arrow
78 outlet
80 arrow
82 gap
84 exhaust system
86 inlet funnel
88 oxidation catalyst
90 outlet funnel
92 particulate filter
94 SCR catalyst
96 pipe section
98 coated particulate filter

The invention claimed is:

1. An exhaust gas aftertreatment device for a motor vehicle, comprising:
   an exhaust pipe;
   a mixing chamber, wherein the mixing chamber is disposed in the exhaust pipe and wherein the mixing chamber mixes an exhaust gas flow with a reducing agent for exhaust gas aftertreatment; and
   a metering device, wherein the reducing agent is introducible into the mixing chamber by the metering device;
   wherein the mixing chamber has an input-side wall which is disposed on an input side of the mixing chamber as viewed in a main flow direction of the exhaust gas flow through the exhaust pipe, wherein a first inlet for the exhaust gas is formed in the input-side wall, wherein the first inlet extends in a region of a lateral surface region of the input-side wall such that exhaust gas entering the mixing chamber through the first inlet is settable in rotary motion about the main flow direction inside the mixing chamber;
   wherein the metering device has an outlet device with a longitudinal axis that is inclined with respect to the main flow direction of the exhaust gas flow;
   wherein the reducing agent is supplyable by the outlet device to an inner face of a curved transition region of the input-side wall between an end face region of the input-side wall, formed substantially perpendicularly to the main flow direction of the exhaust gas flow, and the lateral surface region of the input-side wall and wherein exhaust gas is supplyable to an outer face of the input-side wall in the curved transition region.

2. The exhaust gas aftertreatment device according to claim 1, wherein a length of the first inlet measured in the main flow direction of the exhaust gas flow is greater than a width of the first inlet measured perpendicularly to the main flow direction of the exhaust gas flow.

3. The exhaust gas aftertreatment device according to claim 1, wherein the first inlet and the outlet device are arranged with an angular offset from each other of approximately 40° to approximately 60° in a circumferential direction of the exhaust pipe.

4. The exhaust gas aftertreatment device according to claim 1, wherein the first inlet is disposed upstream of the outlet device as viewed in a flow direction of the exhaust gas set in rotary motion.

5. The exhaust gas aftertreatment device according to claim 1, wherein the mixing chamber has a second inlet in a region of the outlet device, wherein via the second inlet exhaust gas is introducible into the mixing chamber, and wherein the second inlet is a substantially circular opening through which the longitudinal axis of the outlet device passes.

6. The exhaust gas aftertreatment device according to claim 5, wherein the mixing chamber has a third inlet disposed downstream of the outlet device as viewed in a flow direction of the exhaust gas set in rotary motion and wherein via the third inlet exhaust gas is introducible into the mixing chamber.

7. The exhaust gas aftertreatment device according to claim 6, wherein a length of the third inlet measured in the main flow direction of the exhaust gas flow is greater than a width of the third inlet measured perpendicularly to the main flow direction of the exhaust gas flow.

8. The exhaust gas aftertreatment device according to claim 6, wherein the third inlet and the outlet device are arranged with an angular offset from each other of approximately 20° to approximately 40° in a circumferential direction of the exhaust pipe.

9. The exhaust gas aftertreatment device according to claim 6, wherein a sum of the respective first inlet, second inlet, and third inlet cross-sections through which exhaust gas is flowable is approximately 15% to 50% of a cross-section of the exhaust pipe through which exhaust gas is flowable.

10. The exhaust gas aftertreatment device according to claim 1, wherein an outlet for the exhaust gas is disposed in an output-side wall of the mixing chamber, wherein a wall element that has a plurality of passage openings is disposed in the exhaust pipe downstream of the output-side wall of the mixing chamber, and wherein the wall element abuts a circumference of an inner face of the exhaust pipe.

11. The exhaust gas aftertreatment device according to claim 10, wherein a gap is formed between the mixing chamber and the wall element.

* * * * *